United States Patent [19]

Wada et al.

[11] Patent Number: 4,741,962
[45] Date of Patent: May 3, 1988

[54] OPTICAL FILTER MADE OF INORGANIC MATERIAL FOR BLUE LIGHT

[75] Inventors: Masatoshi Wada; Naritoshi Kitamura; Yukikazu Moritsu, all of Osaka; Tetsuo Sakai, Tokyo, all of Japan

[73] Assignees: Okuno Chemical Industries Co., Ltd., Osaka; Nippon Hoso Kyokai, Tokyo, both of Japan

[21] Appl. No.: 744,156

[22] Filed: Jun. 13, 1985

[30] Foreign Application Priority Data

Jun. 20, 1984 [JP] Japan ................. 59-125018

[51] Int. Cl.⁴ .................. B32B 5/22; B32B 13/12
[52] U.S. Cl. .................. 428/428; 428/432; 428/701
[58] Field of Search .......... 428/432, 698, 699, 917, 428/428, 701

[56] References Cited

U.S. PATENT DOCUMENTS

| | | | |
|---|---|---|---|
| 3,097,103 | 7/1963 | Homer et al. | 428/917 X |
| 4,148,761 | 4/1979 | Kazmierowicz | 428/432 X |
| 4,148,940 | 4/1979 | Breininger et al. | 428/432 X |
| 4,160,061 | 7/1979 | Obino et al. | 428/432 X |
| 4,409,285 | 10/1983 | Swerdlow | 428/432 X |
| 4,521,524 | 6/1985 | Yamashita . | |
| 4,525,425 | 6/1985 | Church | 428/432 X |

OTHER PUBLICATIONS

Chemical Abstracts, vol. 98, No. 3, Mar. 21, 1983, p. 300, Reference No. 94502p.

*Primary Examiner*—Nancy A. B. Swisher
*Attorney, Agent, or Firm*—Parkhurst & Oliff

[57] ABSTRACT

This invention relates to an optical filter made of inorganic material for blue light which transfers blue light and absorbs all of the other colored lights by sticking an inorganic mixture powder pasted by mixing with screen oil on a glass substrate and firing it. The mixture includes transparent glass material powder and a combination of oxides of cobalt and aluminum. The contrast of a picture displayed on a display device can be substantially increased by reducing the reflection of incident ambient light without the reduction of brightness on account of the application of the above optical filter onto the displaying screen.

1 Claim, 3 Drawing Sheets

OPTICAL FILTER MADE OF INORGANIC MATERIAL FOR BLUE LIGHT

BACKGROUND OF THE INVENTION

A. Field of the Invention

The present invention relates to an optical filter made of inorganic material for blue light, provided for the application to a display device consisting of a combination of plural kinds of displaying elements emitting different colored lights respectively, particularly with high contrast based on antireflection with low reflectance of ambient light.

B. Description of the Prior Art

Generally, it is required for various kinds of display devices, for instance, a cathode ray tube, a gas-discharge display panel and a low-velocity electron-beam fluorescent display panel, to increase not only the brightness but also the contrast of the display by lowering the reflectance of the displaying surface. If the required level of brightness of the display can be obtained in any manner, the quality of display can be occasionally improved by increasing the contrast thereof.

For lowering the reflectance of the displaying surface in order to increase the contrast thereof, the following various measures have been conventionally adopted.

(i) A neutral density (ND) filter of absorbing type is sticked or combined to a surface of the display screen which is made of glass plate and the like.

(ii) The light absorption of the display screen at a region thereof, at which the radiation spectral intensity of fluorescent material forming the display element is low, is increased by adding a rare earth element, for instance, $Nd_2O_3$ into a material, for instance, glass which is a component of the display screen.

(iii) The light absorption of the display screen is increased at the light wavelength region which is unavailable for the display radiation region by mixing a pigment into the fluorescent material forming the display element.

(iv) The absorption of ambient light is increased by sticking a black material on portions of the display element which consist of other than the fluorescent material.

(v) Granular pigments sticked on the fluorescent material are employed as for a filter.

However, the above conventional measures for increasing the contrast have the following defects respectively.

The increase of contrast according to the application of the ND filter as mentioned in Item (i) is accompanied by decreased brightness.

Although the result obtained by adding the rare earth element into glass as mentioned in Item (ii) is more favorable than that obtained by the above measure of Item (i), the luminous reflectance is not decreased, since the light transmittance of the added material in the vicinity of the wavelength 555 nm is high.

The mixing of the pigment into the fluorescent material as mentioned in Item (iii) is effective for the CRT display device which has a very bright display. However, the application thereof onto the other display devices which cannot afford to lose only brightness seems to be difficult, meanwhile the lowered degree of reflectance thereof seems to be no more than one half at most in practice.

The sticking of black absorbing material on other portions than that emitting the light as mentioned in Item (iv) is effective for all the above display devices. However, this measure is no more than subsidiary.

The sticking of granular pigments onto the fluorescent material as for the filter is not useful in practice, since the pigment contained in the filter presents the granulation, the boundary of which causes the increased reflection based on the scattering of light. In addition, a gap between the front glass and the filter layer, even if trifling, causes the reflection of light at the boundary thereof and hence the lowered contrast.

The present inventors have previously conceived a color display device employing an optical filter made of inorganic material which effectively increases the contrast of the display device, particularly, the color picture display device by removing the above described conventional defects and hence by suppressing the reduction of the brightness of display and have filed a patent application thereof referred to Japanese Patent Laid-open Publication No. 59-36,280.

As described in this publication, in the display device formed of a combination of plural kinds of respectively different displaying elements, the contrast of the picture consisting of colored lights emitted by those displaying elements respectively is increased by almost four times by employing an optical filter formed of substantially transparent inorganic glasses through which those colored lights are transmitted respectively, in comparison with the contrast obtained without this optical filter, that is, the combination of three colored filters of red, green and blue. Further, the reduction of the brightness, which accompanies the application of the filters, is about 20%.

SUMMARY OF THE INVENTION

An object of the present invention is to provide an optical filter made of inorganic material for blue light which object is accomplished by detailed investigation of the inorganic materials and accumulated trial productions of products resulting from the dissatisfaction with the optical filter of this kind as described in the above mentioned Japanese Patent Laid-open Publication No. 59-36,280.

It has been clarified from the results of the above mentioned investigation and trials that newly found inorganic materials and further favorable ranges of composition ratios between those materials can be adopted not only for the conventional improvement of the contrast but also for the increase of the color saturation and further the coloring of substantially uncolored radiation and hence, for instance, for the favorable application onto the high definition television gas-discharge display device.

The present invention relating to the optical filter for blue light among three primary color lights is featured in that a material consisting of a mixture of a transparent glass powder and 10 to 50% by weight of a combination of substantially 36 parts by weight of cobalt oxide and substantially 64 parts by weight of aluminum oxide is adhered to a glass substrate and fired thereafter.

In FIG. 1, the characteristic curve ($B_N$) of the transmission factor ($\tau$) of the aforesaid optical filter for blue light according to the present invention is shown in comparison with the spectrum characteristics (B) and the visual sensitivity characteristic curve ($\bar{y}$) of the display device to which the present invention should be applied and the transmission factor characteristic curve ($B_o$) of the optical filter for blue light as described in the above Japanese Patent Laid-open Publication No. 59-36,280.

As shown in FIG. 1, the transmission factor is favorably improved in the desired region of the spectrum characteristics (B) of the fluorescent material for blue light, meanwhile the transmission factor is decreased in other regions thereof. As a result, synthetically speaking, the contrast ratio is improved by about one and half times even only for blue light in comparison with that as attained in the above Japanese Patent Laid-open Publication.

BRIEF DESCRIPTION OF THE DRAWINGS

For a better understanding of the invention, reference is made to the accompanying drawings, in which.

Figure 1:
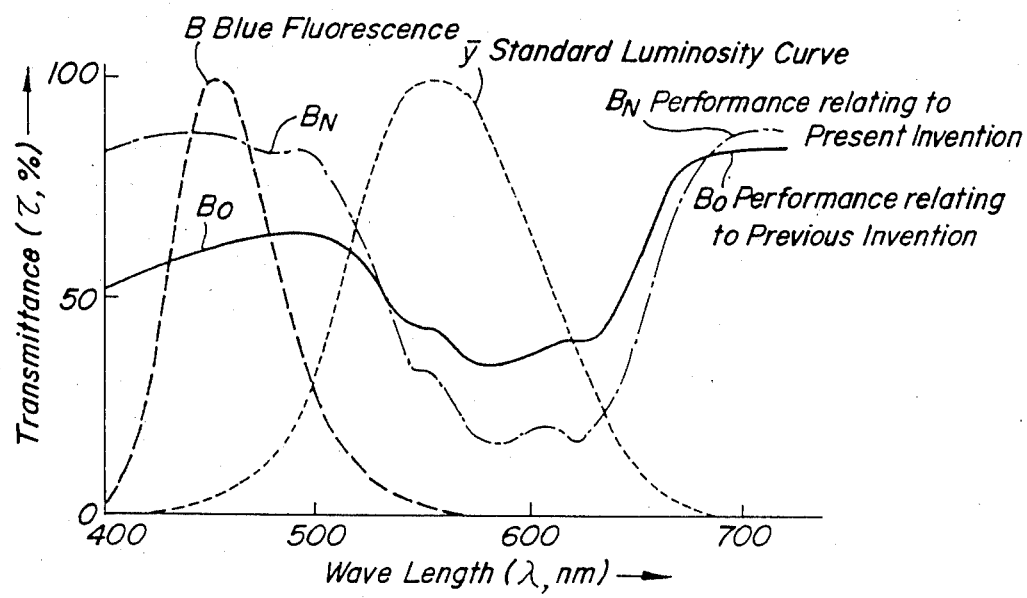
FIGS. 1 to 3 are diagrams showing the characteristic curves of the transmittances of the optical filters for blue, red and green lights according to the present invention respectively in comparison with other relevant characteristic curves.

Throughout different views of the drawings, FG is front glass plate, RG is rear glass plate, CS is cell sheet, Ph is fluorescent material, DA is display anode, C is cathode, UV is ultraviolet ray, RF is filter for red light, GF is filter for green light, BF is filter for blue light, BM is black matrix, RC is cell for red light, GC is cell for green light and BC is cell for blue light.

DESCRIPTION OF THE PREFERRED EMBODIMENTS

The outline of the manufacturing process of the optical filter according to the present invention and technical matters including transparent glass material powder to be mixed with the aforesaid indispensable constituents, screen oils, filter materials and others required for the above manufacturing process will be described in order hereinafter.

(I) Outline of the manufacture of the optical filter:

A combination of 10 to 50% by weight of blue pigment having spinel structure or similar structure, which consists of cobalt oxide (CoO) and aluminum oxide ($Al_2O_3$) and 50 to 90% by weight of colored glass powder containing 0 to 15% by weight of cobalt oxide (CoO) as coloring material, which glass powder can be glazed onto a glass substrate and become transparent by firing at a temperature below 700° C., is adhered to the glass substrate and thereafter fired at a temperature of 450° to 650° C., so as to obtain the desired optical filter. The glass substrate need not necessarily be flat.

(II) Transparent glass powder material:

As for the transparent glass powder material, any desired glass material can be employed, so long as it can be glazed onto the glass substrate at a temperature below 700° C., preferably below 600° C., as a transparent glass layer. For instance, the following descent of $PbO-SiO_2-B_2O_3-ZnO$ can be employed.

powdered silica: 10.0 parts by weight
red lead: 64.4 parts by weight
boric acid: 30.2 parts by weight
zinc oxide: 3.0 parts by weight
aluminum hydroxide: 3.0 parts by weight
potassium carbonate: 3.3 parts by weight.

In addition, the other descents of $PbO-SiO_2-B_2O_3$, $PbO-B_2O_3-ZnO$, $Bi_2O_3-SiO_2-B_2O_3$ and lead-free glass containing no PbO and $Bi_2O_3$ can be employed also. Moreover, any glass material containing at least one compound selected from the group of $R_2O$ (R=Li, Na, K), BaO, CaO, MgO, NaF, $TiO_2$, $ZrO_2$, $Al_2O_3$, $P_2O_5$ can be employed also.

(III) Examples of screen oil:

The following composition can be exemplified for the required screen oil.

diethylene glycol monobutyl ether acetate: 85 parts by weight
terpineol: 10 parts by weight
ethylcellulose: 4 parts by weight
acrylic resin: 1 part by weight.

In this connection, the ratio by weight between the above described glass powder material and screen oil can be favorably selected in a range of 2.5 to 5 parts to 1 part by weight.

(IV) Remaining technical subjects:

The screen printing is effected through screens of 100 to 400 meshes in response to the fineness of the pattern to be printed. In this connection, the black matrix and the like can be printed and fired together with the pattern to be printed.

The above described various kinds of transparent glass pastes are uniformly applied onto glass substrates and then dried at a temperature of about 150° C. or half-fired at a temperature of about 300° C. Thereafter, the conventional positive or negative photoresist for removing the oxidized film is applied thereon and after the photomask is applied on the portions thereof to be removed or to be left through the etching, the exposure is effected thereon, and then, after the development, unnecessary portions thereof are removed by the etching liquid, for instance, of hydrofluoric acid descent. This etching process is repeated, if necessary, with regard to required plural colors.

In this connection, it is also possible that the above described transparent glass paste consisting of glass material powder, after being mixed with photosensitive photoresist, is applied on the glass substrate, and then, after drying, the glass substrate applied with the glass paste is etched by the resist-developing liquid.

As for the material of the photosensitive photoresist used for the etching procedure, various kinds of photoresists which are customarily employed for the production of semiconductor devices, other than polyvinyl alcohol and ammonium dichromate, which are usually adopted for the manufacture of conventional cathode ray tubes, can be employed.

Similarly, as already employed for the application of fluorescent materials, some of chemicals present the selective adhesiveness in response to desired patterns under the application and the exposure. In the situation where the above described glass powder for the optical filter is applied on the patterns presented by these chemicals, the required patterns of glass powder adhering to the glass substrate can be readily obtained. So that, after the subsequent fixing and the removal of impurities, the required optical filter can be realized by firing.

Figure 2:
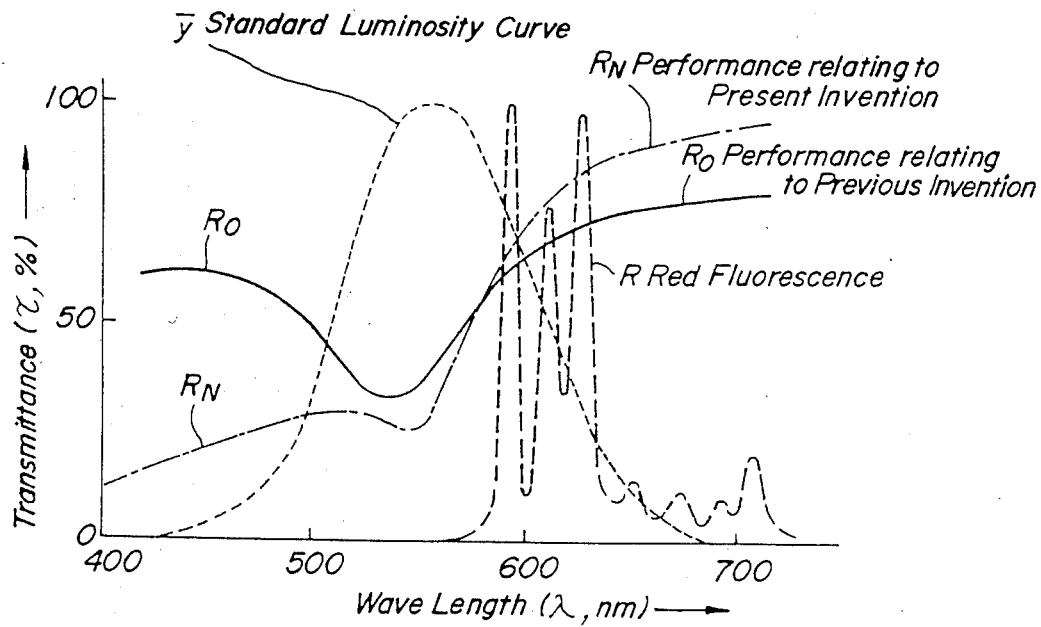
Figure 3:
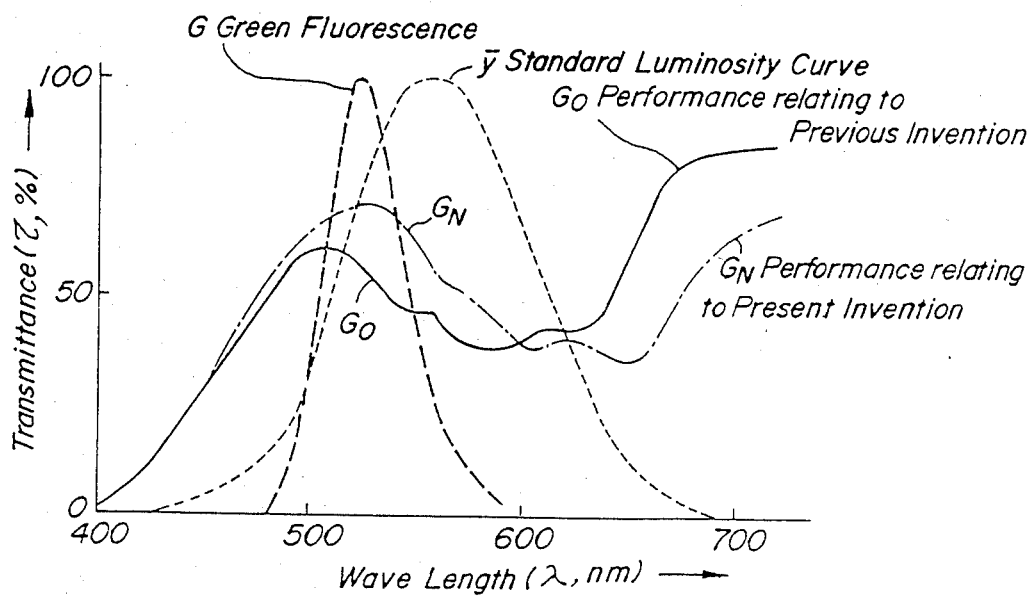

Next, various embodiments of the application of the optical filter according to the present invention will be individually described with regard to the respective operations and effects thereof hereinafter by referring to the accompanying drawings. Particularly with regard to the color display device necessitating the common application of those optical filters for red, green and blue lights, the operation and the effect of the common application of these three kinds of the optical filters according to the present application will be described by referring to FIG. 1 showing the performance of the optical filter for blue light together with FIGS. 2 and 3 showing those for red and green lights respectively.

Figure 4A:
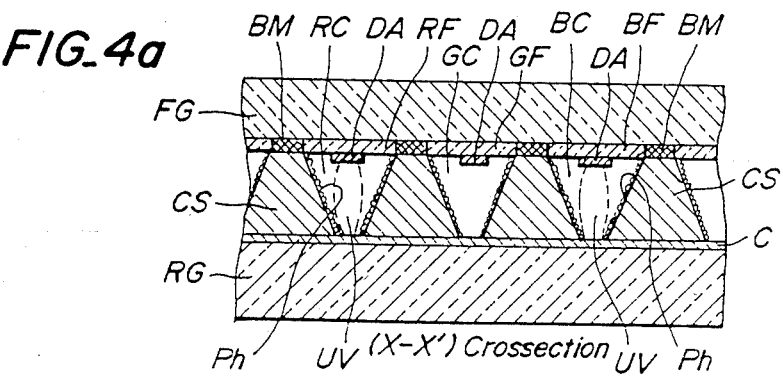
FIGS. 4(a) and 4(b) are a cross-section and a plan showing a gas-discharge display panel applied with the optical filter of the present invention.
Figure 4B:
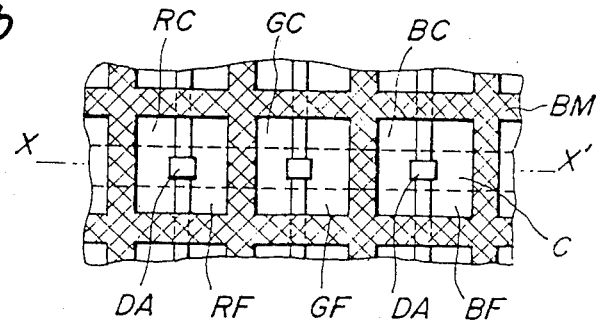

First, with regard to a gas discharge display panel applied with these three kinds of optical filters, the cross-section thereof is shown in FIG. 4(a) and the plan thereof is shown in FIG. 4(b).

In the structure of the matrix type gas discharge display panel as shown in FIGS. 4(a) and 4(b), a cell sheet CS is sandwiched between a front glass plate FG and a rear glass plate RG. In the cell sheet SC, plural spaces provided for individually forming discharge cells are arranged in matrix, and fluorescent materials Ph are applied on inner walls of these spaces for discharge cells, meanwhile display anodes DA and cathodes C are provided on tops and bottoms of these spaces respectively. Gas discharges are individually generated in these cell spaces between the display anodes DA and the cathodes C and hence the fluorescent materials Ph are excited and radiated by the ultraviolet rays UV emitted by these gas discharges. The fluorescent materials Ph are separately applied for respectively radiating in red (R), green (G) and blue (B). So that, respective discharge cells are separately called as R cells, G cells and B cells. In the gas discharge display panel according to the present invention, each of R cells, G cells and B cells arranged similarly as in the conventional panel are individually covered by respective filters RF, GF and BF provided for selectively respective colored lights on the rear surface of the front glass plate FG.

Each of these respective color filters RF, GF and BF are formed of inorganic glass materials which can endure the high temperature heat treatment of the sealing process with frit glass of the panel glass plate which are heated for one hour at the adhering temperature of 430° C. These color filters can be formed, for instance, by printing the aforesaid glass paste on the rear surface of the front glass plate FG.

The color filters added onto the displaying side of the display element of the gas discharge display device according to the present invention as described above make the respective colored lights emit from those display elements without loss, as well as prevent the disturbing colored lights, which have the wavelengths residing outside the same range as the desired colored lights emitted from the respective display elements and included in the ambient light incident upon the respective display elements, from reflecting by absorbing these disturbing colored lights. Thus, these color filters are necessarily formed to absorb all disturbing lights other than the transferring colored lights. In addition, these color filters should be made transparent, since the ambient light incident upon these filters should not be reflected and scattered therefrom.

In the situation where these color filters having the respective performances as described above are arranged over all of the respective display elements, the colored lights emitted from the discharge cells forming respective display elements, for instance, the blue light emitted from the B cell can be derived from the display panel through the respective color filter, for instance, through the blue filter BF substantially without any loss. Further, the B component of the incident ambient light passes through the blue filter BF and is reflected from the white fluorescent materials inside the discharge cell and again passes through the blue filter, and hence derived also from the display surface. However, the R and the G components of the incident ambient light are, even if reflected by the white fluorescent materials Ph inside the B cells, absorbed twice through the blue filters BF, and, as a result, extremely attenuated with the evident level difference from the blue lights emitted from the B cells. Consequently, even though the ambient light is incident upon the display surface, the high contrast display can be attained. This situation of display is just the same with regard to the R cell covered by R filter and the G cell covered by G filter.

In this connection, in the embodiment as shown in FIGS. 4(a) and 4(b), the black lattice consisting of black absorbing material, that is, so-called black matrix BM is provided between each discharge cells, so as to lower the reflectance outside the range of radiation from the display surface unconditionally and hence to further increase the high contrast based on the effect of the color filter accompanying with each discharge cells.

Next, examples of relative radiation spectrum of fluorescent materials Ph applied onto each discharge cell RC, GC and BC composed as mentioned above and the transmittance τ of each of the color filters RF, GF and BF are shown in FIGS. 2, 3 and 1 respectively. In these examples, as shown in these drawings, each one of the primary colored radiation components are taken out approximately with the transmittance of 80%, meanwhile the reflected components other than primary color components of the incident ambient light are attenuated substantially to the zero level. As a result, in the situation where the numbers of each one of the discharge cells RC, GC and BC are the same with each other, the overall luminous reflectance of the exemplified display device is lowered below $0.8^2 \times \frac{1}{3}$, that is, about 10%.

Figure 5:
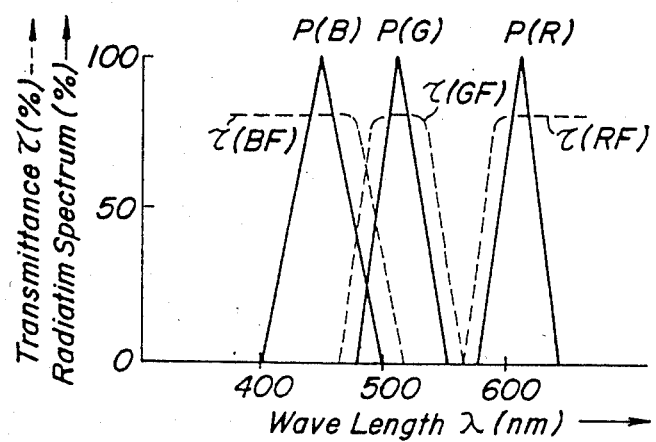
FIG. 5 is a diagram showing an idealized relation between the radiation spectrums of fluorescent materials used for the gas-discharge color display panel and spectral transmittance characteristics of the respective primary color filters according to the present invention.

The idealized curves of the performances as shown in FIGS. 1 to 3 are shown in FIG. 5, although the practical performances are far from these idealized curves. The practical performances obtained from the present embodiment are shown in FIGS. 1 to 3 in comparison with those obtained from the aforesaid previously disclosed color filters.

Similar data of these performances obtained on various conditions of the cell structure including that mentioned above are indicated in Table 1.

TABLE 1

| Cell structure | Compared item | | |
| --- | --- | --- | --- |
|  | Brightness | Luminous reflectance | Contrast |
| Non-filter | 1.0 | 1.0 | 1.0 |
| Gray filter | 0.8 | 0.64 | 1.25 |
| Previous disclosure | 0.8 | 0.20 | 4.0 |
| Present disclosure | 0.8 | 0.13 | 6.0 |

As is apparent from Table 1, the decrease of brightness in the situation where the discharge cell is accompanied with the color filter is slight, while the contrast is increased by six times of that obtained without the accompanied color filter and by more than four times that obtained with the gray filter having no color selectivity.

In addition, as is apparent from FIGS. 1 to 3, the above various performances obtained according to the present invention are further favorable and available for the monochromatic display device, which is arranged such as, in the structure as shown in FIGS. 4(a) and 4(b), only one kind of fluorescent material and color filter are employed, or, otherwise the direct radiation of gas discharge is available without any fluorescent material.

As for well known examples of the discharge gas the radiation of which is directly available for display, neon for reddish orange, krypton for green and argon for blue can be exemplified. In this situation, it is necessary to somewhat increase the density of those color filters. This increase of density can be attained by raising the temperature or increasing the film thickness.

Further speaking in detail about the above mentioned embodiment, the color filters made of transparent inorganic material according to the present invention are arranged to entirely cover all of the discharge cells by being sticked on the rear surface of the front glass plate as shown in FIGS. 4(a) and 4(b). In this situation as shown in those drawings, the display electrodes are arranged on the primary color filters RF, GF and BF sticked on the rear surface of the front glass plate FG by being deposited thereon in the manner such as well known. That is, good conductor metallic materials, for instance, Ni, Au, Ag, Cu, Cu-Al, Cr-Cu-Cr are deposited thereon by spattering, ion-plating, plating and the like, and further, if necessary, are applied with the etching for forming those electrodes together with lead conductors similarly customarily performed.

When those electrode materials formed as described above are fired, it is feared that the metallic materials of those electrodes deposited on the color filters are diffused into the materials forming those filters and hence the performances of those color filters are deteriorated. So that, it is preferable that a diffusion preventing layer is deposited between those materials or that metallic materials which can be fired at a possibly low temperature are selectively employed for those electrodes. As for the etching effected for forming those electrodes in the situation where those color filters are made of materials readily affected by the etching, it is required that those filter materials be protected by being covered with any transparent layer for obstructing the etching liquid, which layer can be preferably formed of dielectric materials, for instance, $CaF_2$ and $Ta_2O_5$, customarily used for providing the color separating filter deposited inside the face plate of the single tube type color television camera tube.

In this connection, it is a matter of course that the above exemplified gas discharge display panel can be made similar as conventionally well known, except for that mentioned above.

Next, examples of a display device other than gas discharge display panels, for instance, the cathode ray tube to be applied with the present invention will be described hereinafter.

As for arranging the aforesaid primary color filters inside the face plate of the cathode ray tube, particularly the color cathode ray tube according to the present invention, it is favorable to provide the filter materials thereon by coating and etching processes similar as effected for arranging fluorescent material dots thereon, since it is difficult to arrange those filters only by the aforesaid printing process on the basis of the fact that the face plate of the cathode ray tube is not flat similarly as described above and that the pitch of the arranged fluorescent material dots is distinctly smaller than that of discharge cells in the above described gas-discharge display panel. Accordingly, the aforesaid colored glass material for the primary color filter is uniformly coated into a thin layer overall of inner surface of the face plate, and, after drying or half firing, the photoresist is deposited overall of this thin layer of glass material. Thereafter, just similarly as for forming the fluorescent dots, those layers are exposed by the light source disposed at the deflection center of the electron beams through the shadow mask, and then the etching is applied, so as to leave the colored glass material only on the positions to be arranged with the primary color filters.

These processes of coating and etching of the colored glass materials are repeated with regard to respective primary colors, and further as for the black matrix, the similar process as for forming the fluorescent layer is carried out, and then the firing thereof is performed.

Thereafter, the conventional process for forming the fluorescent layers, and, as a result, the situation where the absorbing type color filters made of transparent inorganic material for transferring respective primary color lights are arranged overall of respective primary color fluorescent dots can be obtained.

Next, an example of low velocity electron beam type fluorescent display panel applied with the present invention will be described hereinafter.

In the application of the present invention onto the display panel of this type, similarly as in the aforesaid gas-discharge display panel, first the colored glass filters having the desired shapes are sticked on the front glass plate, and then the transparent electrode layers are deposited thereon and, further, the fluorescent layers having the desired shapes provided for the excitation of the low velocity electron beam are deposited thereon. Behind the front glass plate arranged as described above, the grid electrodes, the electron beam generator and the like are provided similarly as in the conventional panel of this type.

The present invention can be widely applied also onto the display devices of various types other than those described above, including the flat face type cathode ray tube display device, the letter and figure display device and the like, in which device a plurality of light-emitting or light-controlling elements, for instance, so-called EL, namely, electro-luminescent elements, light-emitting diodes, liquid crystal display device are arranged in matrix or in segments with regard to plural color tones, with the similar operational effects as described above.

As described above in detail, in the monochromatic display device, the absorbing type color filter made of transparent inorganic material according to the present invention is uniformly or selectively applied with regard to a single color on the front or the rear surface of the front glass plate, meanwhile, in the multicolor display device, these color filters are arranged separately for respective colors overall of front sides of display elements, so as to transfer all of colored lights emitted from the multicolor display device substantially without any transmission loss and to absorb all of unnecessary components of the incident ambient light with the extremely increased high contrast. However, the conventional method for preventing the reflection of the ambient light as described earlier can be adopted in common in the manner as described as follows, with the extremely distinct effect for the increase of contrast.

Similarly as in the conventional color cathode ray tube display device, to the front glass plate of the display device applied with the composition of the present invention is added rear earth elements, for instance, $Nd_2O_3$, so as to facilitate the further increase of operational effect obtained by the color filter according to the present invention.

In addition, in the situation where the present invention is applied onto the color cathode ray tube display device, when the pigment is mixed into the fluorescent materials employed therefor, so as to absorb colored lights in the range other than that to be displayed, the operational effect of the color filter according to the present invention can be further increased.

On the other hand, the average reflectance of each one of the display elements can be reduced to 10% or less, so that a reflectance of about 5% on the surface of the front glass plate becomes extremely significant in comparison with the conventional display device. Accordingly, the front surface of the front glass plate of the display device applied with the composition of the present invention can be applied with the low reflection coating with remarkable effect. The low reflection coating applied on the color glass filter reduces the reflection therefrom, so that the output radiation therefrom indicates a little increase. In this connection, this low reflection coating can be effected in the last stage of the manufacturing process of the display device according to the present invention. However, it is preferable that, in the step wherein the process for manufacturing the front glass plate is finished by fixing the color filters of the present invention to the display anodes and others on the rear surface thereof, this low reflection coating is applied on the front surface thereof. In this situation, the coating material is affected by the heating procedure at about 430° C. included in the frit glass treating process for sealing the front and the rear glass plates with each other, so that it is preferable also to employ a heat-resisting coating material which can endure the high temperature as described above.

The optical filter according to the present invention can be utilized for color filters to be arranged in front of the cathode ray tube, as well as for the display of figures and the like on a glass plate, various kinds of shades, various kinds of decorations and others and further for various kinds of optical devices.

A picture having monochromatic half tone can be reproduced by superposing a picture printed with black glass paste upon the monochromatic filter according to the present invention.

The color filter of the present invention can be applied for displaying a fixed picture as well as for a stained glass like use.

A combination of tri-primary color filters available of the above use will be exemplified as follows.

Figure 6A:
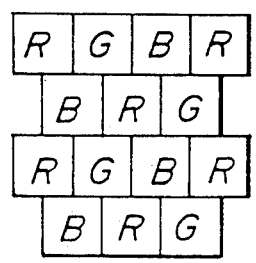
FIGS. 6(a) and 6(b) are diagrams showing examples of the fixed display applied with the optical filters of the present invention respectively.

Plural rows of minute color filters having comparatively small areas are arranged as shown in FIG. 6(a), so as to present the half tone by controlling the transmittance or the reflectance of those minute color filters.

Figure 6B:
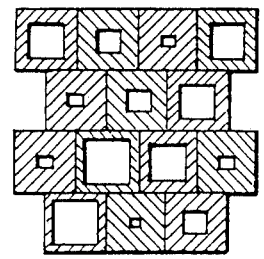

As for the source of the picture to be displayed, a video signal used, for instance, for television broadcasting is adopted, which signal is stored in a frame memory. The video signal derived from the frame memory at an appropriate speed is applied for preparing an original manuscript and further a screen. In this step, the video signal has been sampled in response to the color arrangement as shown in FIG. 6(a), with the derivatives in response to the densities to be presented through the screen. These densities, that is, the deviations are controlled, for instance, by the area occupied with the black glass paste, as shown in FIG. 6(b). In the situation where the fixed picture reproduced through the above screen is viewed with the light passing therethrough, the saturation of the color of the color glass filter is increased. Meanwhile, in the situation where this fixed picture is viewed with the light reflected therefrom, the above saturation is decreased through the diffusing plane having a high reflectance, which is disposed on the filters and otherwise can be sticked upon the glass substrate. In this connection, it is possible also that the black glass paste as shown in FIG. 6(b) is printed directly or through the diffusing plane on the glass substrate and fired and thereafter combined with the color filters, so as to facilitate the display of colored picture, which can be changed by changing the picture drawn with the black glass paste only. The poster consisting of this colored picture based on the combination of the color filter and the monochromatic picture may be permanently preserved and hence applicable for the high grade of fine arts and further valuable for a commercial display on its basis of durability against the ultraviolet rays, the high temperature and high humidity.

As is apparent from the above description, the optical filter made of inorganic material according to the present invention can substantially reduce the reflectance of the display surface of various kinds of color display devices by the application thereof, substantially without decrease of the display brightness. So that, it is possible to substantially increase the contrast of displayed picture thereon in comparison with that in the conventional device by preventing the reflection of incident ambient light, and otherwise to reduce the load of the display device by lowering the display brightness in the situation where the required contrast is maintained. Accordingly, even when the radiation efficiency of the display device is not so high, it is possible to obtain the excellent picture display with high contrast as well as to lower the sensitivity of the flicker interference by facilitating the low brightness display. As a result, the low field speed scanning of a displayed picture can be realized.

Particularly in the situation where the composition of the present invention is applied onto a gas discharge display panel, the disturbing components of the radiation other than the required color components thereof can be absorbed and removed through the color filters according to the present invention, even if the radiation from the filler gas can be directly viewed, so that a decrease in the color purity of the displayed picture can be obviated. As a result, it is beneficial to employ gases for instance, Ne, which cannot be employed for the gas discharge because of the direct view of the radiation therefrom, although the high brightness radiation can be obtained therefrom.

In this connection, the constituents of the color filters according to the present invention consist only of inorganic materials at least in the situation where these filters are practically used. So that, the deterioration of performances which is caused by the light exposure, and further the impurities including the undesired gases are scarcely generated, even in the situation where those materials are sealed in the gaseous space of the gas discharge display panel. Consequently, according to the present invention, it is possible to obtain various evident effects such that the life of the gas discharge display panel is not inferiorly affected at all.

What is claimed is:

1. An optical filter made of inorganic materials for blue light, comprising:
   a glass substrate, and
   a layer adhered to said glass substrate and fired at a temperature of 450° C. to 650° C., said layer comprising a powdered mixture of inorganic materials including indispensable constituents consisting of
   50-90% by weight of a colored glass powder including 0 to 15% by weight of cobalt oxide, said colored glass powder being glazed onto said glass substrate and made transparent by firing at a temperature below 700° C., said cobalt oxide being used for coloring the glass powder, and
   10-50% by weight of blue pigment having spinel structure of a combination of substantially 36 parts by weight of cobalt oxide and substantially 64 parts by weight of aluminum oxide.

* * * * *